Figure 1:
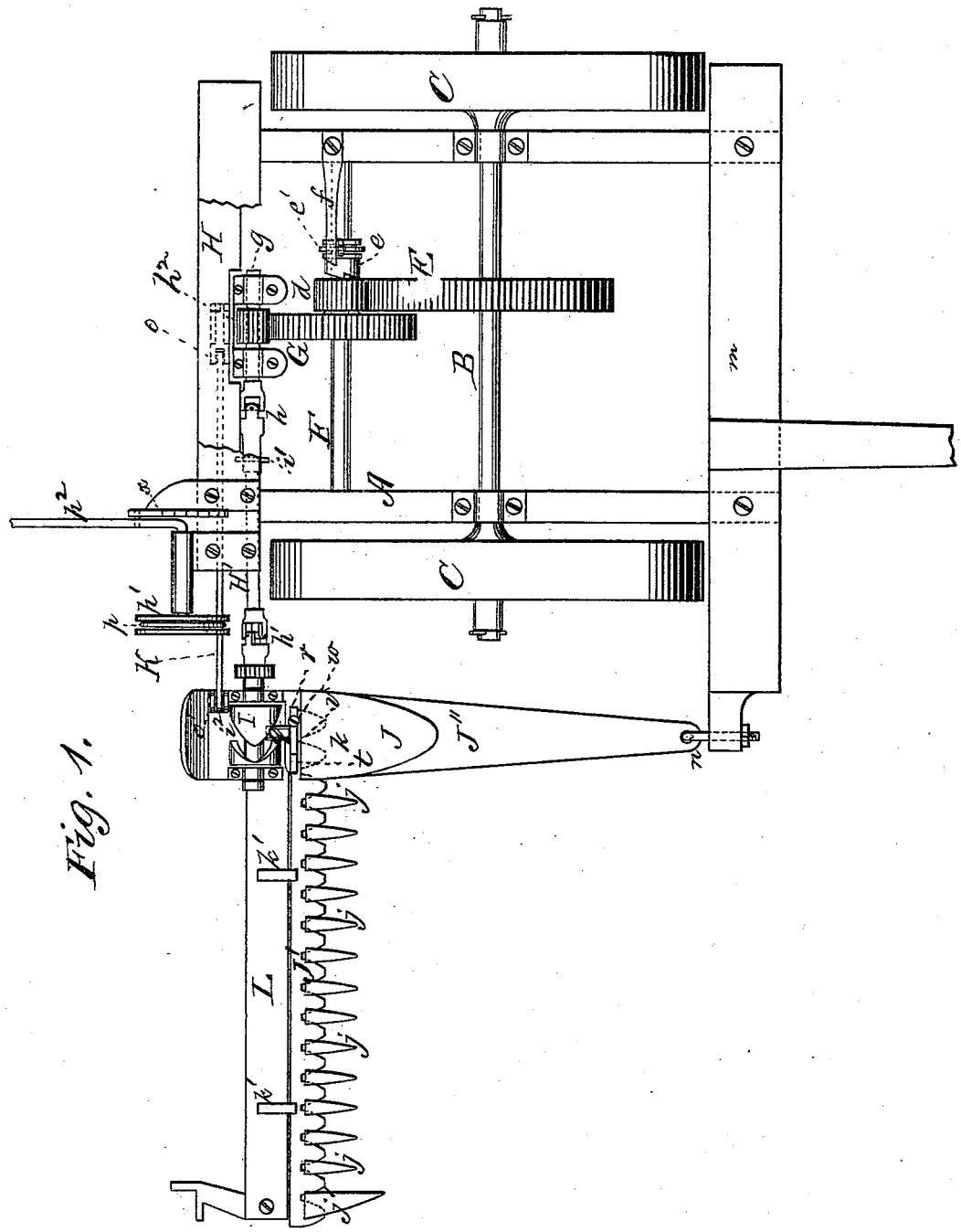

3 Sheets—Sheet 1

W. D. PAXTON.
Mowers.

No. 212,048. Patented Feb. 4, 1879.

WITNESSES
Villette Anderson
F. J. Mabi.

INVENTOR
William D. Paxton,
by E. W. Anderson,
ATTORNEY

3 Sheets—Sheet 2.
W. D. PAXTON.
Mowers.
No. 212,048. Patented Feb. 4, 1879.
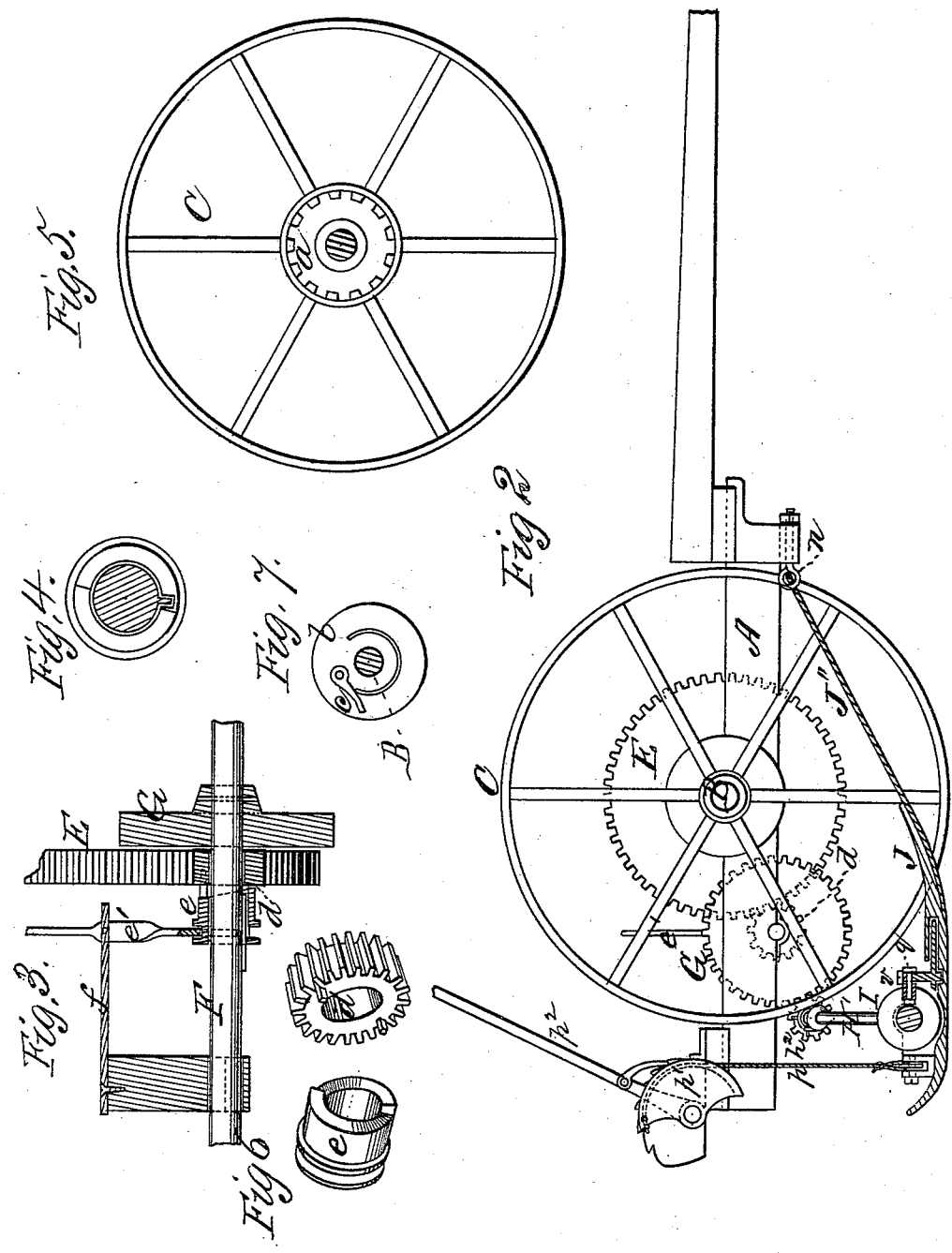
WITNESSES
Villette Anderson
T. J. Maai
INVENTOR
William D. Paxton,
by E. W. Anderson,
ATTORNEY
N. PETERS, PHOTO-LITHOGRAPHER, WASHINGTON, D. C.

3 Sheets—Sheet 3.
W. D. PAXTON.
Mowers.
No. 212,048. Patented Feb. 4, 1879.
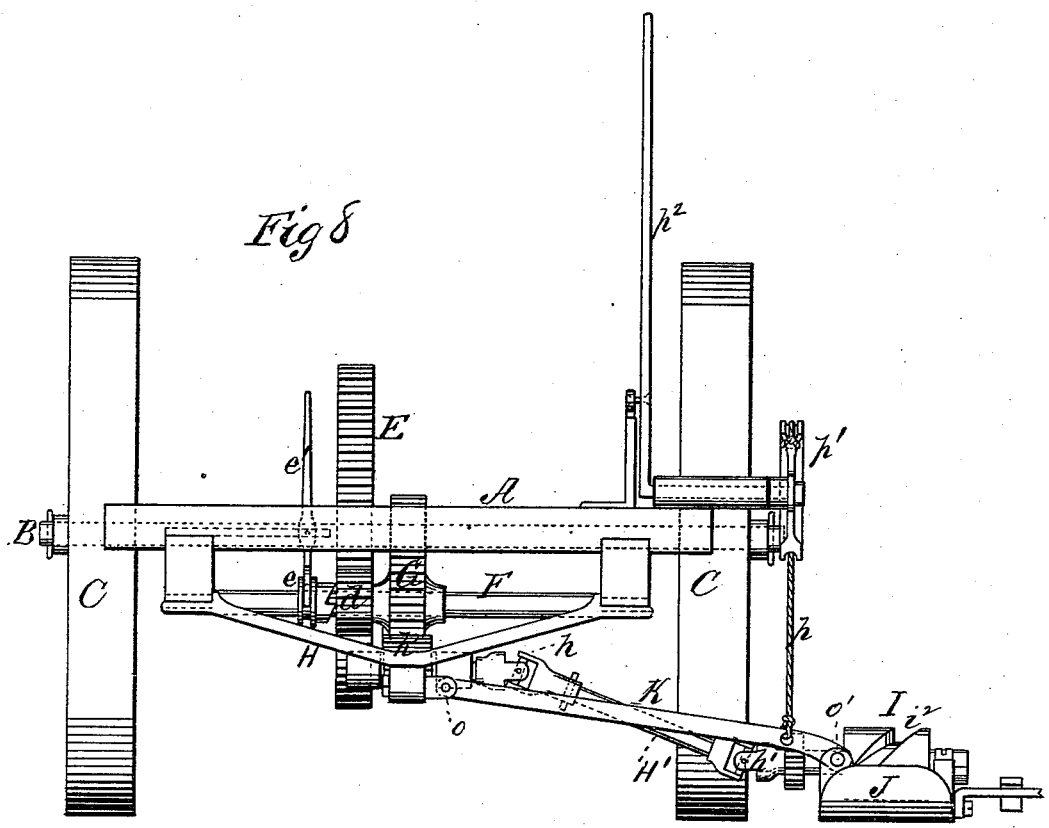
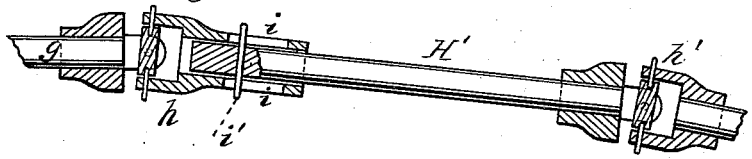
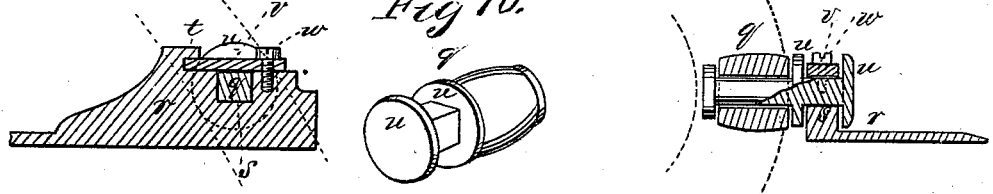
WITNESSES
Villette Anderson.
F. J. Masi.
INVENTOR
W. D. Paxton,
by E. W. Anderson,
ATTORNEY

UNITED STATES PATENT OFFICE.

WILLIAM D. PAXTON, OF FREDERICKSBURG, OHIO.

IMPROVEMENT IN MOWERS.

Specification forming part of Letters Patent No. 212,048, dated February 4, 1879; application filed February 2, 1878.

*To all whom it may concern:*

Be it known that I, WILLIAM D. PAXTON, of Fredericksburg, in the county of Wayne and State of Ohio, have invented a new and valuable Improvement in Harvesters and Reapers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of my improved harvester. Fig. 2 is a side view thereof with the shoe in section. Figs. 3, 4, 5, 6, 7, 9, and 10 are detail views, and Fig. 8 is a rear view, of the harvester.

This invention has relation to improvements in harvesters and mowers.

The nature of the invention consists in the construction and novel arrangement of a pillow on the heel of a cutter-bar having a rectangularly-recessed seat and a raised undercut lug, in connection with a squared and flanged pin operating in a cam-groove and a securing-cap fastened by the lug, as will be hereinafter shown and described.

In the annexed drawings, the letter A designates the frame of my improved harvester and cutter; B, an axle journaled thereon, and C the transporting-wheels, supporting the frame. The hub of this wheel has a recessed ratchet, $a$, and the axle a disk, $b$, fitting in the hub and provided with a spring-actuated pawl, $c$, which engages the said ratchet, and causes the said axle to rotate when the mower is going ahead, but allows the wheels to rotate independently in backing.

The axle B has centrally keyed thereon a master gear-wheel, E, that meshes with a pinion, $d$, upon a second shaft, F, having its bearings in the frame parallel to and in rear of the main shaft. This pinion fits loosely on its shaft and is locked thereto by a clutch, $e$, that is endwise movable upon a suitable spline, and is engaged with said pinion by means of a lever, $e'$, having its fulcrum in an arm, $f$, of the frame. Shaft F has a gear-wheel, G, rigidly secured thereto.

H represents a metallic plate extending across the rear end of the frame and affording bearings to a short shaft, $g$, having rigidly secured thereon a pinion, $h^2$, that meshes with the gear-wheel G aforesaid. The shaft $g$ is at right angles to the length of the frame, and is coupled by a universal joint, $h$, to a connecting-rod, H', the other end of which is coupled to a cam, I, by a similar universal joint, $h^1$.

The cam I has its bearings in the metallic shoe J at the rear end of a drag-bar, J'', the front end of which is universally coupled to the front bar, $m$, of the frame, as shown at $n$, Fig. 1.

K represents a metallic rod pivoted by a universal joint, $o$, to an offset upon the under side of the rear plate, H, of the frame, and by an ordinary joint, $o'$, to the shoe J, near its rear end. This rod is connected by a rope or chain, $p$, to a winding wheel or drum, $p^1$, rotated by means of a lever, $p^2$, to raise or lower the cutting apparatus, and controlled by a pawl on the lever engaging a ratchet, $x$, on the frame.

The outer branch of the coupling $h$ is tubular, and provided with opposite longitudinal slots $i$, and the contiguous end of the connecting-rod H' is seated in the bore of the said branch, and connected thereto by pins $i^1$, engaged with the said slots.

The cam I is obliquely slotted, as shown at $i^2$. The finger-bar L is bolted in the usual manner to the shoe, and is provided with the horizontally-slotted fingers $j$ and divider $j'$.

The cutter-bar J' is of the usual form, and is seated in a rabbet upon the front edge of the finger-bar, and engaged with the slotted fingers and divider aforesaid, and with a guide, $k$, upon the shoe. Its rear edge is held down into the rabbet by the cleats $k'$, secured to the finger-bar and overhanging the cutter-bar, as shown in Fig. 1.

The cutter-bar has upon its end contiguous to the slotted cam I a raised pillow, $r$, having a square seat, $s$, and at one end an undercut offset, $t$, and in this seat is placed the cam-pin $q$, of corresponding form, having an anti-friction roller engaging the slot of the cam, and prevented from endwise motion by flanges $u$, which embrace the pillow $r$.

The cam-pin is kept in its seat by a trunnion plate or cap, $v$, one end of which is introduced between the flanges $u$ aforesaid, under the overhang of the offset $t$, and the other secured to the pillow by a suitable screw, $w$. The free end of the cutter is raised or supported by means of a rope or chain secured to the divider, and extending inward to the driver's seat, and the inner end thereof raised by the lever $p^2$; consequently, the cutter can be adjusted at any desired elevation from the ground, or may be swung up into an inclined position for clearing a stump or other obstacle, the movement being allowed because of the endwise movement which the connecting-shaft H' has in the tubular branch of the coupling $h$ of the shaft.

It will be observed that all the operative parts of the driving mechanism connected directly with the cutter are in the same line, and that the driving-gears are also in the same line. There is, therefore, but one change of direction of the motion, which greatly simplifies the machine, while increasing its effectiveness.

What I claim as new, and desire to secure by Letters Patent, is—

The combination of the pillow $r$ upon the heel of the cutter-bar, having rectangularly-recessed seat $s$ and raised undercut lug $t$, the squared pin $q$, operating in the cam-groove $i$, and having flanges $u$, and the cap $v$, having one of its ends passed under said lug, and secured by a screw, $w$, to the pillow, substantially as specified.

In testimony that I claim the above I have hereunto subscribed my name in the presence of two witnesses.

WILLIAM D. PAXTON.

Witnesses:
WARREN FOUST,
WILLIAM SHAFFER.